(12) United States Patent
Florenz

(10) Patent No.: US 7,260,987 B2
(45) Date of Patent: Aug. 28, 2007

(54) METHOD FOR CAPACITIVE MEASUREMENT OF FILL LEVEL

(75) Inventor: Hans-Jörg Florenz, Neuffen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 83 days.

(21) Appl. No.: 10/496,833

(22) PCT Filed: Nov. 8, 2002

(86) PCT No.: PCT/EP02/12469

§ 371 (c)(1),
(2), (4) Date: May 19, 2005

(87) PCT Pub. No.: WO03/046490

PCT Pub. Date: Jun. 5, 2003

(65) Prior Publication Data

US 2006/0219002 A1    Oct. 5, 2006

(30) Foreign Application Priority Data

Nov. 27, 2001 (DE) ................................ 101 57 762

(51) Int. Cl.
*G01F 23/26* (2006.01)
*G01F 23/00* (2006.01)

(52) U.S. Cl. .................................................. 73/304 C
(58) Field of Classification Search ............. 73/394 C, 73/304 R
See application file for complete search history.

(56) References Cited

U.S. PATENT DOCUMENTS 4,176,553 A * 12/1979 Wood ........................ 73/304 C
4,266,118 A *  5/1981 Takase et al. ................ 219/492

FOREIGN PATENT DOCUMENTS

| DE | 38 12 687 A1 | 10/1989 |
| DE | 197 55 417 C2 | 7/1999 |
| EP | 005 7278 A1 | 8/1982 |
| EP | 0008 4405 A1 | 7/1983 |
| GB | 13 34 916 | 10/1973 |

* cited by examiner

*Primary Examiner*—Hezron Williams
*Assistant Examiner*—Tamiko Bellamy
(74) *Attorney, Agent, or Firm*—Bacon & Thomas, PLLC

(57) ABSTRACT

In a method for the capacitive fill level measurement of a fill substance in a container, electrical current is determined at two alternating voltage signals $U_1$, $U_2$ of differing frequencies $f_1$, $f_2$. On the basis of the two values for current, the capacitive reactance and therewith the fill height h of the fill substance can be easily determined. Influences of ohmic resistance on the measurement results are eliminated in this method.

4 Claims, 1 Drawing Sheet

METHOD FOR CAPACITIVE MEASUREMENT OF FILL LEVEL

FIELD OF THE INVENTION

The invention relates to a method for the capacitive measurement of fill level.

BACKGROUND OF THE INVENTION

Arrangements for the capacitive measurement of the level of fill of a substance in a container using a measuring electrode and an evaluation circuit have been known for a long time.

In such arrangements, the capacitance between the measuring electrode and the usually metallic container is evaluated. The capacitance depends essentially on the fill height of the fill substance in the container.

As a rule, the capacitance is ascertained by determining the reactance of the measuring arrangement. For this, an alternating voltage is produced, and the associated alternating electrical current, or its amplitude, is measured. There is a simple relationship involving the amplitude of the alternating voltage and the amplitude of the alternating current, also referred to as the amount of current, for obtaining reactance, and, from that, using the frequency, the capacitance can be calculated.

SUMMARY OF THE INVENTION

Troublesome in the case of such measuring methods is that the amount of current depends not only on the capacitive reactance, but also on the ohmic resistance of the measuring arrangement. This affects the accuracy and the reliability of the measurement results.

The ohmic resistance of the measuring arrangement can have various causes. On the one hand, a conductive coating can form on the measuring electrode, and this coating can provide a connection to the metallic container. On the other hand, moisture can accumulate in the fill substance and lead to an increase in the conductivity of the fill substance.

Various possibilities are known for suppressing the influence of the ohmic resistance on the measurement results.

In the case of one known method, the ohmic resistance of the measuring arrangement is directly measured and taken into consideration when evaluating the amount of current. A special measuring circuit is needed for this, together with an involved evaluation.

In another method, a phase-selective measuring of the amount of current is carried out. In this way, components in the amount of current that stem from ohmic resistance are minimized. A phase-selective measuring circuit is very complex and very sensitive to temperature fluctuations, especially of the measuring circuit. These temperature fluctuations must, when a reliable measurement result is desired, be considered. Moreover, electromagnetic interfering radiation (EMV), as well as drifts of the individual components of the measuring circuit affect the measurement results negatively. Such influences on the measurement results can only be taken into consideration with considerable expense.

An object of the present invention is to provide a method for capacitive fill level measurement involving simple means and yielding an accurate and reliable measuring of the fill level in a container.

The object is achieved by a method for capacitive fill level measurement of a fill substance in a container utilizing a measuring electrode and an evaluation circuit and having the following method steps:

producing a first voltage signal having a first frequency $f_1$;
determining the associated first amount of current;
producing a second voltage signal having a second frequency $f_2$;
determining the associated second amount of current;
determining the capacitive reactance from the two current values and the two frequency values; and
determining the fill height h of the fill substance from the reactance.

An essential idea of the invention is that the unknown size of the ohmic resistance is eliminated by measuring the amount of current at two different frequencies, so that the fill level of the fill substance in the container can be determined with simple means, independently of ohmic resistance.

Advantageous further developments of the invention are given in the dependent claims.

The two frequencies $f_1$ and $f_2$ are chosen such that they differ from one another by a factor of two.

BRIEF DESCRIPTION OF THE DRAWINGS

The invention will now be explained in greater detail on the basis of an example of an embodiment illustrated in the drawings, which show as follows.

DESCRIPTION OF THE PREFERRED EMBODIMENT

Figure 1:
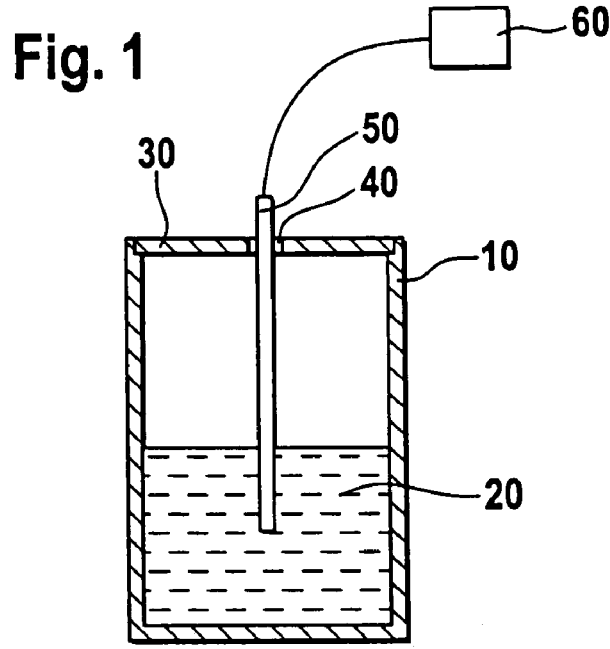
FIG. 1 Schematic drawing of a measuring arrangement for determining the fill level of a fill substance in a container.

FIG. 1 is a schematic drawing of a measuring arrangement for determining the fill level in a container. Present in container 10 is a fill substance 20, whose fill height h, i.e. the fill level h, is variable. Container 10 is closed with a lid 30. The lid 30 has an insulating duct 40, in which a measuring electrode 50 is mounted. The measuring electrode 50, which extends over the entire height h of the container 10, is connected with a measuring circuit 60.

Figure 2:
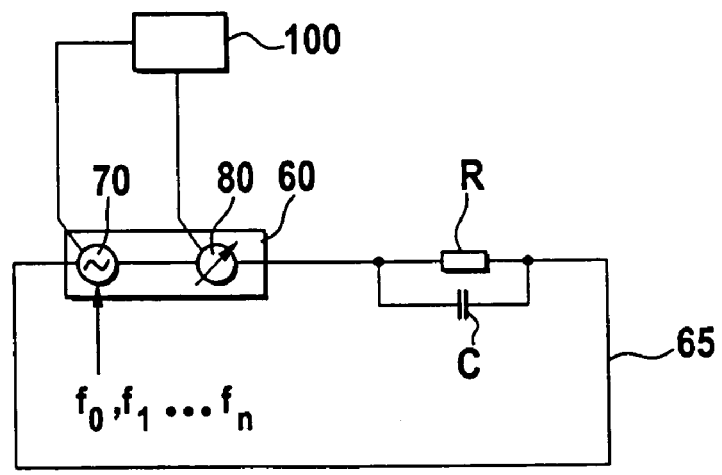
FIG. 2 Equivalent circuit of the arrangement of FIG. 1 with evaluation circuit in schematic presentation.

FIG. 2 shows the equivalent circuit diagram for FIG. 1.

The measuring circuit 60 includes, essentially, a switchable oscillator 70 and a current measuring circuit 80, which are connected in series and connected with an evaluation unit 100, which is not shown in greater detail. Measuring electrode 50, container 10 and fill substance 20 form together an ohmic resistance R and a capacitance C in parallel. Resistance R and capacitance C are grounded by way of the container 10. This is indicated by the return line 65. Oscillator 70 delivers an alternating voltage signal U having a fixed amplitude and an adjustable frequency f. Suitable frequencies for the method of the invention lie in the region between 10 kHz and 10 MHz. Advantageously, the oscillator 70 includes a frequency divider, with which the frequency f of the alternating voltage signal U can be easily halved.

Now, the method of the invention will be explained in greater detail. With the help of the oscillator 70, an alternating voltage signal $U_1$ of frequency $f_1$ is produced and fed to the measuring electrode 50. With the help of the current measuring circuit 80, the amount of current $I_1$ at this frequency $f_1$ is measured and this measurement is forwarded to the evaluation unit.

Subsequently, a switching of the oscillator 70 to an alternating voltage signal $U_2$ of frequency $f_2$ occurs. Also at this frequency $f_2$, the amount of current $I_2$ is measured, and the corresponding measurement is forwarded to the evaluation unit. In the evaluation unit, the reactance of the measuring arrangement is determined from the two values $I_1$, $I_2$ of current and the two frequencies $f_1$, $f_2$ and, from the reactance, the capacitance and therewith the fill height h of the fill substance 20 calculated.

The ohmic resistance of the measuring arrangement has no influence on the measured value in the method of the invention. Even in the cases of coating formation or moist fill substance, a reliable measurement is assured without involved measuring circuits.

A frequency divider in the oscillator 70 permits easy selection of the two frequencies such that they differ from one another by a factor of two.

The invention claimed is:

1. A method for capacitive fill level measurement of a fill substance in a container utilizing a measuring electrode and an evaluation circuit, comprising the steps of:

producing a first alternating voltage signal $U_1$ having a first frequency $f_1$;

applying said first alternating voltage signal $U_1$ to the measuring electrode and determining the amount of an associated first current value $I_1$;

producing a second alternating voltage signal $U_2$ having a second frequency $f_2$;

applying said second alternating voltage signal $U_2$ to the measuring electrode and determining the amount of an associated second current value $I_2$;

determining the capacitive reactance from the two current values $I_1$, $I_2$ and the two frequency values $f_1$, $f_2$; and determining the fill height h of the fill substance from the reactance.

2. The method as claimed in claim 1, wherein: the frequencies $f_1$, $f_2$ lie in the frequency range from 10 kHz to 10 MHz.

3. The method as claimed in claim 1, wherein: the two frequencies $f_1$, $f_2$ differ by a factor in the range from 2 to 20.

4. A method as claimed in claim 3, wherein: the two frequencies $f_1$ and $f_2$ differ by a factor of two.

* * * * *